Oct. 15, 1957 E. L. MILLER 2,809,696
WORK SUPPORTING ATTACHMENT FOR SHEARING MACHINES
Filed Jan. 31, 1955 2 Sheets-Sheet 1
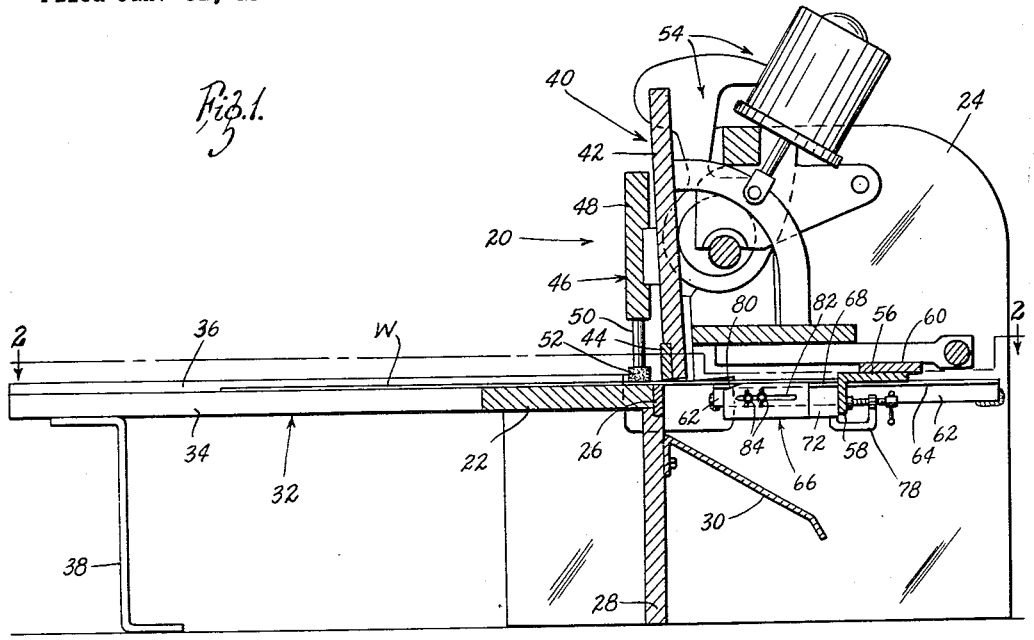
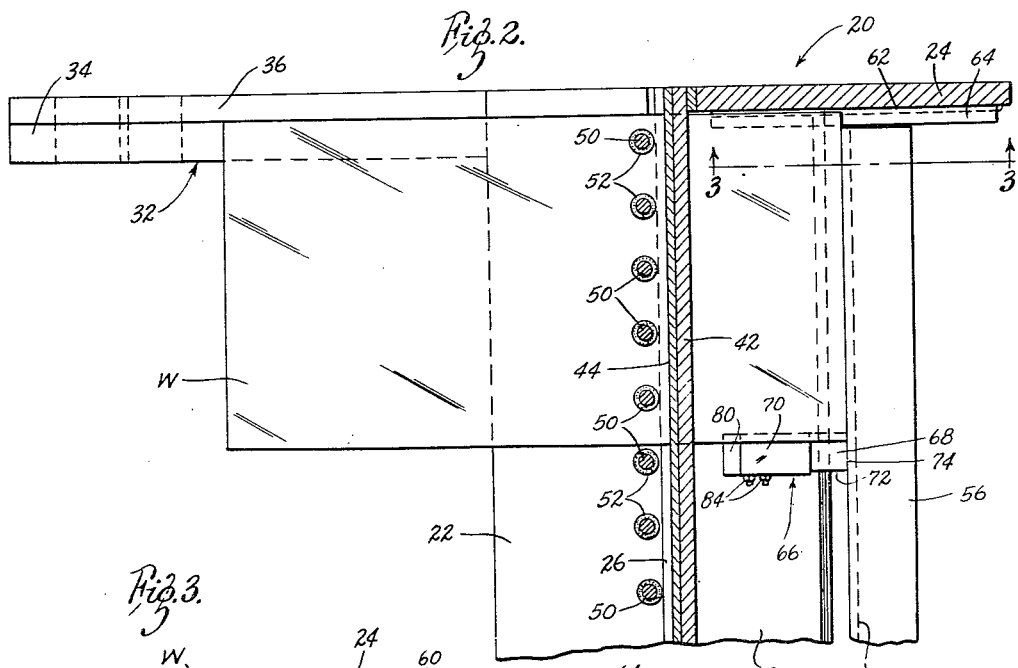
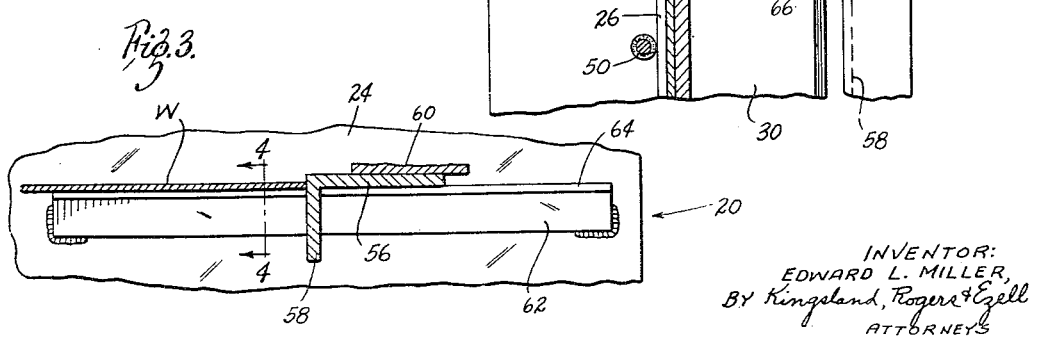
INVENTOR:
EDWARD L. MILLER,
BY Kingsland, Rogers & Ezell
ATTORNEYS

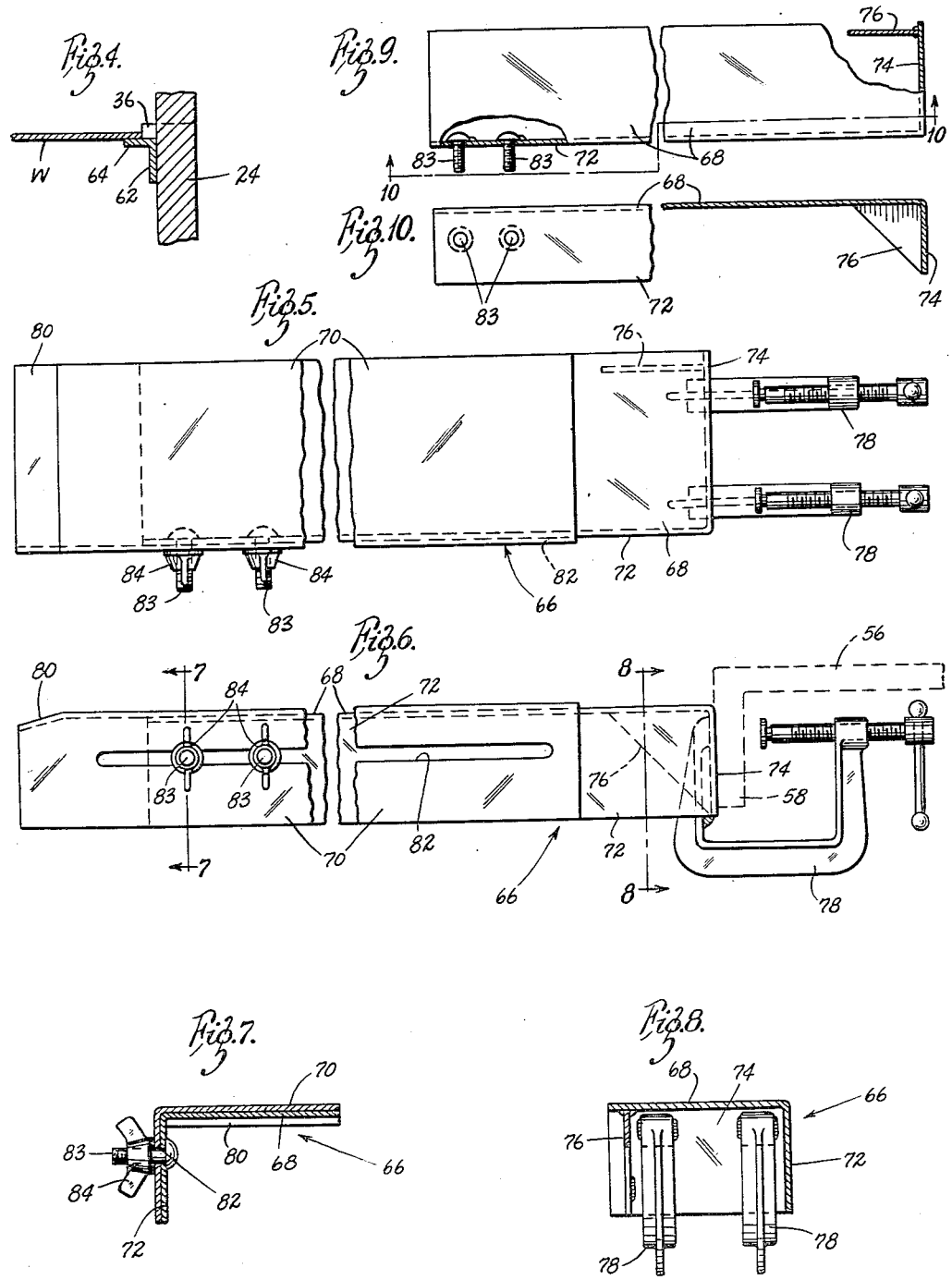

2,809,696
Patented Oct. 15, 1957

2,809,696
WORK SUPPORTING ATTACHMENT FOR SHEARING MACHINES

Edward L. Miller, Belleville, Ill.

Application January 31, 1955, Serial No. 485,149

2 Claims. (Cl. 164—59)

The present invention relates generally to supporting devices, and more particularly to an accessorial set of auxiliary supports for attachment to a conventional shearing machine for initial added support and guidance of a workpiece and subsequent automatic release of a sheared-off segment of the original workpiece.

Briefly, the present invention contemplates an improved arrangement for supporting and guiding flexible sheet material in conventional shearing machines. Customarily, such machines include a table surface with a stationary shearing blade adjacent one edge thereof, and have a movable power driven blade for shearing cooperation with the stationary blade. The workpiece, a relatively thin sheet of metal, for example, ordinarily rests upon the table with the portion to be cut off extended, without support, beyond the shearing blade. As soon as it is cut off, the overhanging segment drops to the floor.

Generally, the shearing machine is provided with an adjustable stop or measuring gauge which the advancing edge of the workpiece engages in measuring the portion to be cut off. If the overhanging portion is of such size as to extend more than a relatively few inches, however, it tends to bend downward due to its own weight and thus increases the difficulty of making accurate measurement.

It is an object of the present invention, therefore, to provide novel supporting means for sheet metal stock, a measured portion of which is to be sheared off and removed from the machine.

It is another object of the invention to provide a novel set of attachments for a conventional shearing machine, which attachments are adapted for support of sheet metal stock during a measuring and shearing operation.

It is another object of the invention to provide novel means for guiding and supporting the leading edge and both sides of a workpiece so as to maintain the same substantially level during a measuring and shearing operation.

It is another object of the invention to provide novel means for guiding and supporting sheet metal stock preparatory to a shearing operation, said guiding and supporting means being adapted for release of the sheared-off segment.

The foregoing and additional objects and advantages will be apparent from the following description, taken in conjunction with the accompanying drawings, in which:

Figure 1 is a sectional elevation taken along a vertical plane extending longitudinally through a conventional shearing machine and showing stock supporting elements constructed and arranged in accordance with the teachings of the present invention.

Figure 2 is a horizontal sectional view taken generally along the line 2—2 of Figure 1;

Figure 3 is a fragmentary vertical sectional view taken generally along the line 3—3 of Figure 2;

Figure 4 is a fragmentary vertical sectional view taken generally along the line 4—4 of Figure 3;

Figure 5 is a top plan view of a removed laterally adjustable support;

Figure 6 is a side elevation thereof;

Figure 7 is a vertical sectional view taken generally along the line 7—7 of Figure 6;

Figure 8 is a vertical sectional view taken generally along the line 8—8 of Figure 6;

Figure 9 is a fragmentary top plan view of a removed bracket element, portions being broken away to reveal details thereof in section; and Figure 10 is a fragmentary elevation, partly in section, taken generally along the line 10—10 of Figure 9.

As previously indicated, the present invention contemplates structure which is accessorial with respect to conventional shearing machines. Hence, Figures 1 through 4 of the drawings are illustrative of the environment in which the invention has its primary use, while Figures 5 through 10 illustrate specific structural details of the invention. The reference numeral 20 indicates a shearing machine of generally conventional configuration and arrangement.

The machine 20 comprises a table 22 extending laterally between spaced side frames, only one of the latter, designated 24, being shown in the drawings. A transversely extending shearing blade 26 is mounted along one edge of the table 22 and is rigidly supported by a girder 28 which joins the table along this same edge. A deflector plate 30 is mounted on the girder 28 so as to extend rearwardly and downwardly therefrom, as clearly illustrated in Figures 1 and 2. Preferably, the table 22 has a forwardly extending arm 32 comprising an elongated supporting rest 34 having its upper surface coextensive with the planar upper surface of the table 22, and having a squaring rail 36 disposed at right angles with the shearing blade 26 and extending substantially from the blade 26 to the end of the supporting rest 34. A suitable support 38 is provided at the free end of the assembly 32.

A power-driven operating mechanism, shown generally as 40 in Figure 1, is disposed between and supported by the side frames of the machine 20. The mechanism 40 includes a movable ram 42 having a shearing blade 44 fixed at its lower edge for cooperation with the shearing blade 26 aforementioned. A hold-down assembly 46 comprising a cross member 48 provided with a series of resiliently mounted press bars 50 having resilient shoes 52 is disposed forwardly of the ram 42 in a position where it may be moved downwardly so as to effect a clamping action upon a sheet of metal which rests upon the table 22.

Th mechanism 40 includes also well known actuating means designated generally by the numeral 54 and actuatable to effect an operating cycle which includes a preliminary downward movement of the hold-down assembly 46 followed by a shearing reciprocation of the ram 40 and, finally, a lifting of the hold-down assembly 46.

A backstop 56 having a vertical flange 58 extends laterally between the side frames of the machine 20 and is adjustably mounted on a suitable carriage assembly 60 for movement towards and away from the fixed shearing blade 26. Thus disposed, the backstop 56 is adapted to serve as a measuring gauge for a sheet metal workpiece, such as indicated at W in Figures 1 through 4. The workpiece W, resting upon the table 22, is advanced so as to extend rearwardly beyond the cutting blade 26 until the leading edge of the workpiece abuts the vertical flange 58.

Reiterating, it is to be understood that the machine 20 as described up to this point is wholly conventional and, hence, forms no part of the present invention, per se. What the invention teaches, and what is deemed to represent an advance in the shearing machine art is the combination with a shearing machine, such as 20, of auxiliary supporting devices now to be described.

Each of the Figures 1 through 4 depicts a fixed side support 62 having the form of a simple angle member. The support 62 is shown secured to the side frame 24 so as to dispose a horizontal flange 64 with its upper surface substantially in the same plane as the upper surface of the table 22. Although the securement of the support 62 to the side frame 24 is illustrated as being by welding, it will be understood that securement may take any conventional form, such as using nuts and bolts, C clamps, etc.

Referring now particularly to Figures 2 and 4, it will be noted that the horizontally disposed flange 64 of the support 62 has a lateral width such as to extend inwardly beyond the inside edge of the squaring rail 36. While it is essential that the flange 64 extend laterally beyond the rail 36 as illustrated, it is nevertheless preferred that the extension be specifically limited for a reason to appear. Typically, the flange 64 will extend approximately one-half inch inwardly of the rail 36, although it is to be understood that this is not a required dimension.

An adjustable center support 66 is illustrated in Figures 1 and 2 as being removably secured to the vertical flange 58 of the backstop 56. This support 66 is also illustrated in Figures 5 through 10, wherein it will be noted that the support 66 includes a bracket assembly 68 and a guide member 70 which is adjustable with respect to the bracket assembly 68.

The bracket assembly 68 is preferably constructed from sheet metal to the form clearly illustrated in Figures 9 and 10. As here shown, an elongated piece of sheet metal has adjacent sides bent downwardly to form depending flanges 72 and 74. The adjoining edges of these flanges 72 and 74 are welded together and a gusset 76 is welded adjacent the free end of the flange 74 and to the horizontal portion of the member 70. This makes a structurally rigid bracket which, when its end flange 74 is secured to an appropriate rigid member, provides a rigid cantilever support.

The illustrated means for thus securing the bracket assembly 68 to the machine 20 takes the form of a pair of ordinary C clamps 78. The clamps 78 may be welded to the flange 74 as illustrated in Figure 8.

The guide member 70 also takes the form of an elongated angular member and has its horizontal flange bent downwardly so as to form a short ramp 80. An elongated slot 82 is provided in the depending flange of the member 70 and receives the shanks of two machine screws 83 welded to the flange 72 of the bracket 68 as clearly shown in Figures 9 and 10. Wing nuts 84 are provided for the screws 82 and serve to clamp the guide member 70 in selected position relative to the bracket assembly 68.

The supports 62 and 66 together constitute a set of attachments which may be mounted on a machine 20 in a manner to provide improved performance of the latter in its intended service. The normal operation of the machine 20 involves placing a workpiece, such as the sheet metal piece designated W in Figures 1 and 2, upon the table 22 and the squaring arm 32 with the side edge of the workpiece flush against the squaring rail 36. The forward end of the workpiece is then advanced beyond the fixed shearing blade 26 until it abuts the measuring stop 56. As previously mentioned, this measuring stop 56 is conventionally adjustable relative to the blade 26. The mechanism 54 is then actuated to instigate the holding and shearing action previously described, and the portion of the workpiece W which extends from the blade 26 to the backstop 56 is sheared off and drops down onto the deflector plate 30, being thereby shunted to an appropriate receiving bin, or the like. Thus, it may be seen that ejection of the sheared-off piece is automatic and the workpiece may be again advanced so as to present another portion to be sheared off.

It is obvious that when the machine 20 is operated in the manner described, and particularly when the backstop 56 is adjusted to a position which is relatively remote from the blade 26, the extended portion of the workpiece W will tend to bend downwardly and thus provide an inaccurate measurement due to the arcuate conformation. As a matter of fact, it is not unusual for the end of the workpiece to miss the depending flange 58 of the backstop 56, which requires that this leading edge be manually lifted to obtain even a nominal measurement of the portion to be sheared off. It is the purpose of the present invention to overcome this undesirable condition, and, at the same time, to retain for the machine 20 all of its inherent operational characteristics.

As previously mentioned, the support 62 is secured to the side frame 24 at such a level that the advancing workpiece W will overlap and rest upon its horizontal flange 64. The support 66, besides being adjustable as to length, is also positionally adjustable along the backstop 56. The support 66 is therefore disposed at a point along the backstop 56 where the workpiece W will overlap and rest upon the horizontal flange of the member 70. Preferably, however, this overlap is, as in the case of the support 62, relatively small. This limited overlap is illustrated in Figure 2, and it may again be mentioned that an overlap of approximately one-half inch on both the support 62 and the support 66 would be typical.

Whereas the support 62 may occupy a fixed position with its forward end just behind the reciprocable ram 40, the fact that the support 66 is mounted upon the movable backstop 56 requires corresponding adjustment in the total length of the support 66. This adjustment is obtained by movement of the member 70 relative to the member 68, the adjustment being maintained by the screws 82 and wing nuts 84.

With the supports 62 and 66 in the positions illustrated in Figures 1 through 4, the workpiece W is supported at its side edges and, hence, may be advanced without deflection until its forward edge abuts the backstop 56 as illustrated in Figure 3. Thus, an accurate measurement is obtained. When the forward portion of the workpiece W has been cut off by operation of the ram 40, the weight of the sheared-off portion, along with the inherent flexibility of the sheet metal itself, is sufficient to cause the central portion of the piece to settle downwardly until the side edges are slipped off the supports 62 and 66. The piece is then deflected by the member 30 to a desired location and the workpiece W may once more be advanced in preparation for another shearing operation. Despite the addition of the supports 62 and 66, the feature of automatic ejection of the sheared-off portions of the workpiece W is retained.

Clearly, there has been described a set of work supporting attachments for a shearing machine which fulfills the objects and advantages sought therefor.

It is to be understood that the foregoing description and the accompanying drawings have been given only by way of illustration and example. It is to be further understood that changes in the form of the apparatus, rearrangement of elements, or the substitution of equivalent elements, all of which will be apparent to those skilled in the art, are contemplated as being within the scope of the invention, which is limited only by the claims which follow.

What is claimed is:

1. For use with a shearing machine comprising a table provided with shearing means adjacent one edge, a pair of parallel side frames extending perpendicularly beyond said shearing means, and gauging means extending laterally between said side frames, a set of auxiliary supports attached to said shearing machine so as to provide support and guidance for a workpiece extended beyond said table, said set comprising a side support in the form of an elongated angle member fixedly attached to one of said side frames, and a center support assembly including a bracket and a second elongated member adjustably mounted thereon attached to said gauging means, each of said supports including a work supporting surface for cooperative support of a workpiece at opposite edges.

2. A set of work supporting attachments for a shearing machine having transversely extending shearing means, a longitudinal side member perpendicular to the shearing means, and a transverse cross member parallel to the shearing means, said set including a side support attached to the side member between the shearing means and the cross member, and a center support attached to the cross member and extending toward the shearing means, said side support comprising an enlongated member providing a fixed horizontal ledge extending laterally inwardly from the side member, said center support comprising an elongated bracket having an elongated member adjustably disposed thereon and providing a fixed horizontal ledge in laterally spaced parallel relation to said side support, and means fixedly retaining said adjustably disposed elongated member in a selected longitudinal position on said bracket.

References Cited in the file of this patent

UNITED STATES PATENTS

| | | |
|---|---|---|
| 641,027 | Martin | Jan. 9, 1900 |
| 1,347,536 | Downie | July 27, 1920 |
| 1,979,413 | Seft | Nov. 6, 1934 |
| 2,197,260 | Pickett | Apr. 16, 1940 |
| 2,603,291 | Williams | July 15, 1952 |
| 2,675,873 | Weirich | Apr. 20, 1954 |

FOREIGN PATENTS

| | | |
|---|---|---|
| 160,225 | Switzerland | May 1, 1933 |